US008328437B2

United States Patent
Tseng

(10) Patent No.: US 8,328,437 B2
(45) Date of Patent: Dec. 11, 2012

(54) OPTICAL FIBER CONNECTOR

(75) Inventor: Shun-Chi Tseng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 94 days.

(21) Appl. No.: 12/728,266

(22) Filed: Mar. 21, 2010

(65) Prior Publication Data

US 2011/0044592 A1 Feb. 24, 2011

(30) Foreign Application Priority Data

Aug. 18, 2009 (CN) .......................... 2009 1 0305756

(51) Int. Cl.
*G02B 6/36* (2006.01)

(52) U.S. Cl. ........................................................ 385/93

(58) Field of Classification Search ...................... 385/93
See application file for complete search history.

(56) References Cited

U.S. PATENT DOCUMENTS

| 5,283,802 | A | 2/1994 | Hsiung | |
|---|---|---|---|---|
| 6,364,543 | B1* | 4/2002 | Fairchild et al. | 385/92 |
| 6,793,539 | B1* | 9/2004 | Lee et al. | 439/701 |
| 6,909,821 | B2* | 6/2005 | Ravasio et al. | 385/24 |

FOREIGN PATENT DOCUMENTS

| CN | 2392186 | 8/2000 |
|---|---|---|
| CN | 1596184 | 3/2005 |

\* cited by examiner

*Primary Examiner* — Jerry Blevins

(74) *Attorney, Agent, or Firm* — Altis Law Group, Inc.

(57) ABSTRACT

An optical fiber connector includes an insulative shell and a number of externally threaded converging lenses. The insulative shell defines a front wall, a rear wall opposite to the front wall. A number of receiving cavities extend from the front wall to the rear wall and through the insulative shell. Each receiving cavity includes a threaded screw hole at the end thereof. Each externally threaded converging lens is screwed at an end of the receiving cavity and configured to focus and collimate light transmitted from an optical fiber received in the receiving cavity.

10 Claims, 5 Drawing Sheets

OPTICAL FIBER CONNECTOR

BACKGROUND

1. Technical Field

The present disclosure relates to connectors, and particularly, to an optical fiber connector.

2. Description of Related Art

Optical fiber connectors often include a housing and a number of lenses integrated with the housing. The housing receives a number of optical fibers therein and the lenses are configured for converging light signals emitted from the optical fibers. However, in such an integrated structure, when one of the lenses is broken, the whole connector becomes useless.

What is needed, therefore, is an optical fiber connector, which can overcome the above shortcomings.

DETAILED DESCRIPTION

Figure 1:
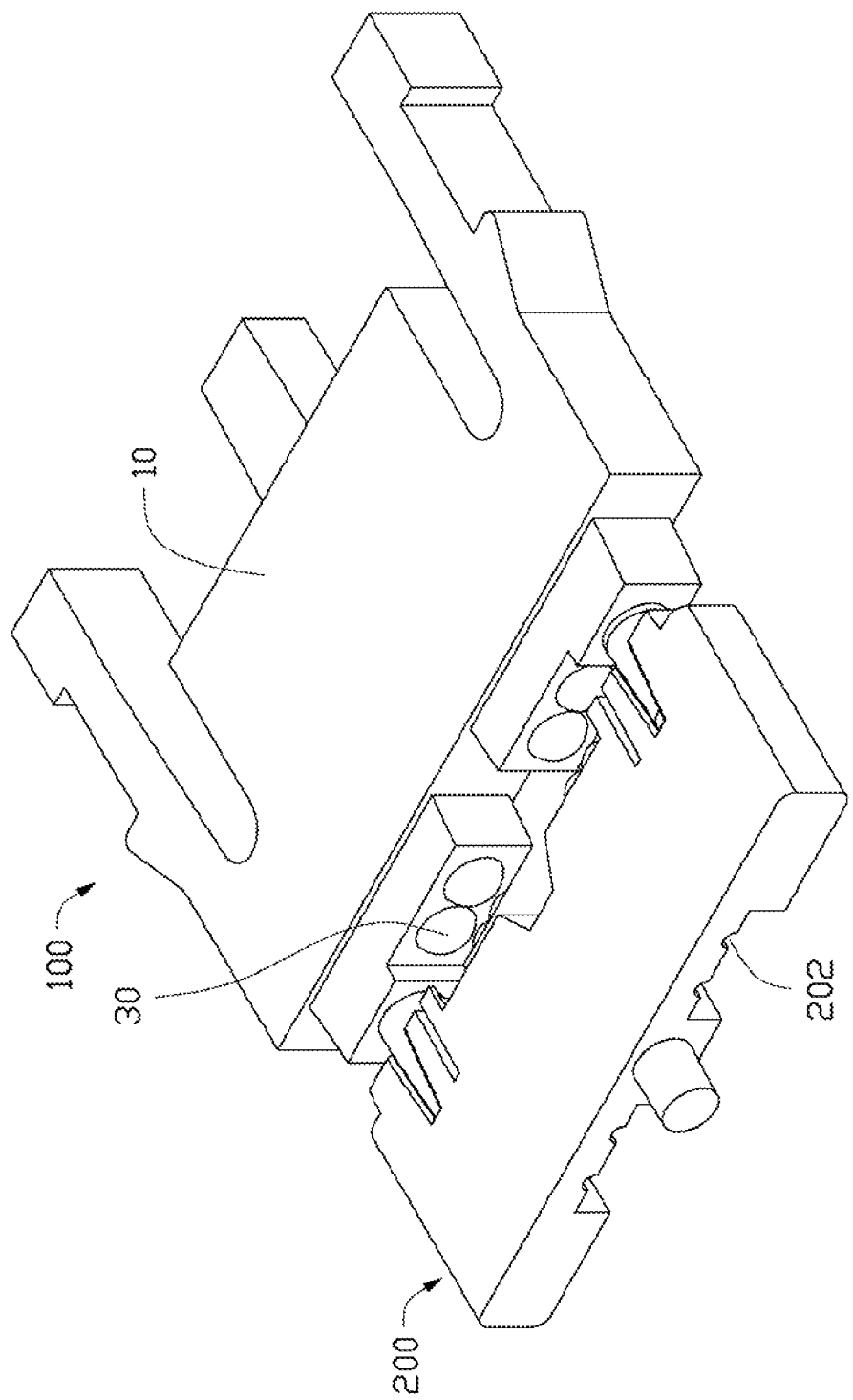
FIG. 1 is an isometric view of an optical fiber connector in accordance with an embodiment, showing the optical fiber connector connected to a continuous portion.
Figure 2:
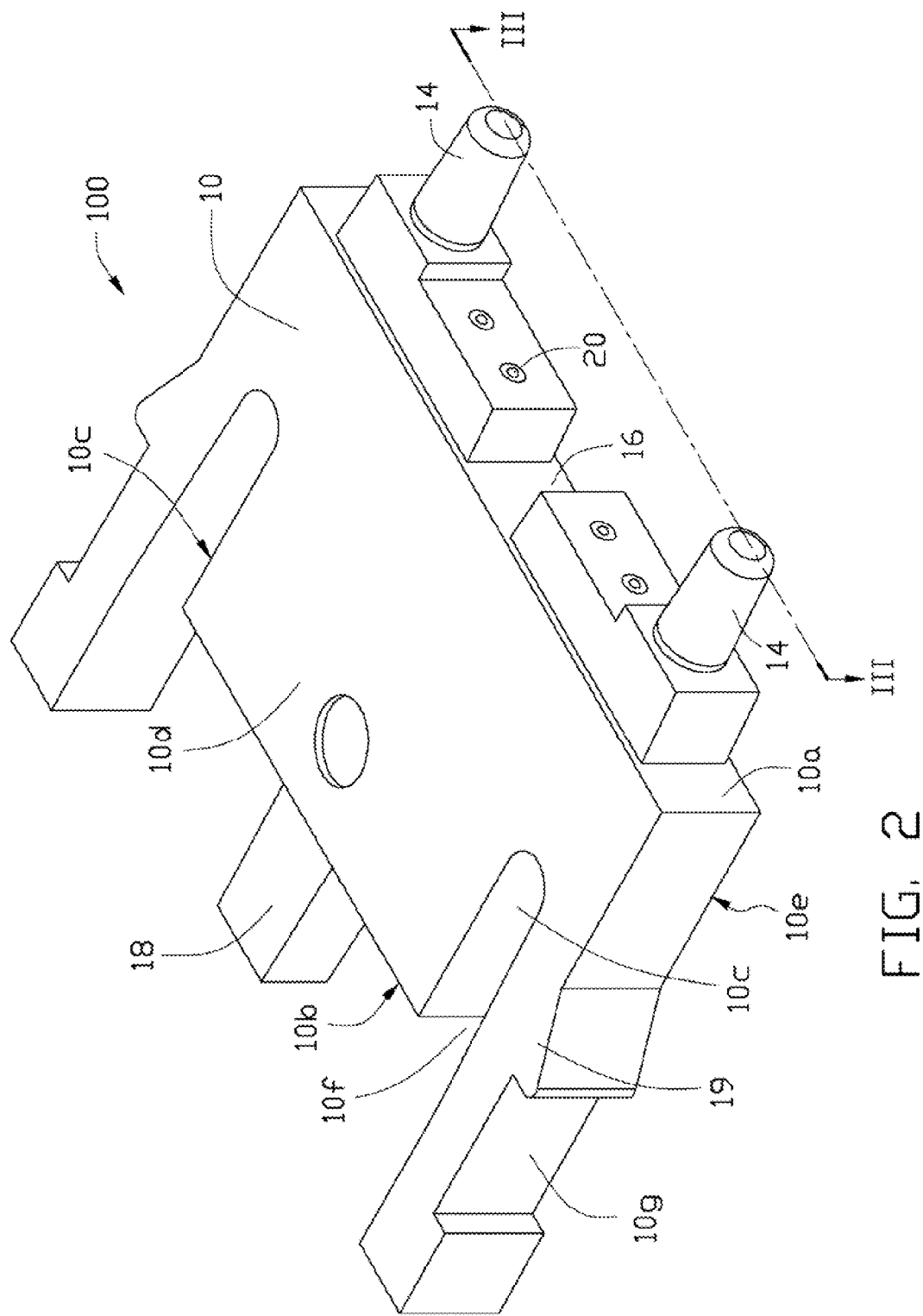
FIG. 2 is an isometric view of the optical fiber connector of FIG. 1.

Referring to FIGS. 1 and 2, an optical fiber connector 100 in accordance with an embodiment, is shown. The optical fiber connector 100 includes an insulative shell 10 defining a number of receiving cavities 12 (see FIG. 3) therein, and a number of externally threaded converging lenses 20 each located at an end of the receiving cavity 12. The receiving cavities 12 are configured to receive a plurality of optical fibers (not shown) therein and the externally threaded converging lenses 20 are configured to focus and collimate the light transmitted from the optical fibers. Each of the externally threaded converging lenses 20 and the insulative shell 10 are separately molded.

In detail, the insulative shell 10 includes a front wall 10a, and a rear wall 10b opposite to the front wall 10a. Two opposite sidewalls 10c interconnect the front wall 10a and the rear wall 10b. The insulative shell 10 further includes a top wall 10d interconnecting the front wall 10a, the rear wall 10b, and the sidewalls 10c. A bottom wall 10e is defined opposite to the top wall 10d. Two pins 14 extend from the front wall 10a and a cutout 16 is defined between the two pins 14. The two pins 14 are engaged with a corresponding continuous portion 200 defining two Universal Serial Bus (USB) interfaces 202, thereby connecting the optical fiber connector 100 to a peripheral device. A tail portion 18 extends from the rear wall 10b which is opposite to the cutout 16, so as to aid the optical fiber connector 100 to be pressed to the continuous portion 200. An elastic arm 19 extends from the front wall 10a to the rear wall 10b on each sidewall 10c. A slot 10f is defined between each sidewall 10c and the corresponding elastic arm 19, to provide a space for flexing the elastic arm 19 relative to the sidewall 10c. The elastic arms 19 each define a recess 10g in the outer surface thereof away from the corresponding sidewall 10c, for convenient operation.

It is noteworthy that the optical fiber connector 100 may also include the continuous portion 200 combining to form an integrated optical fiber connector assembly, but herein the continuous portion 200 is just briefly described for brevity.

Figure 3:
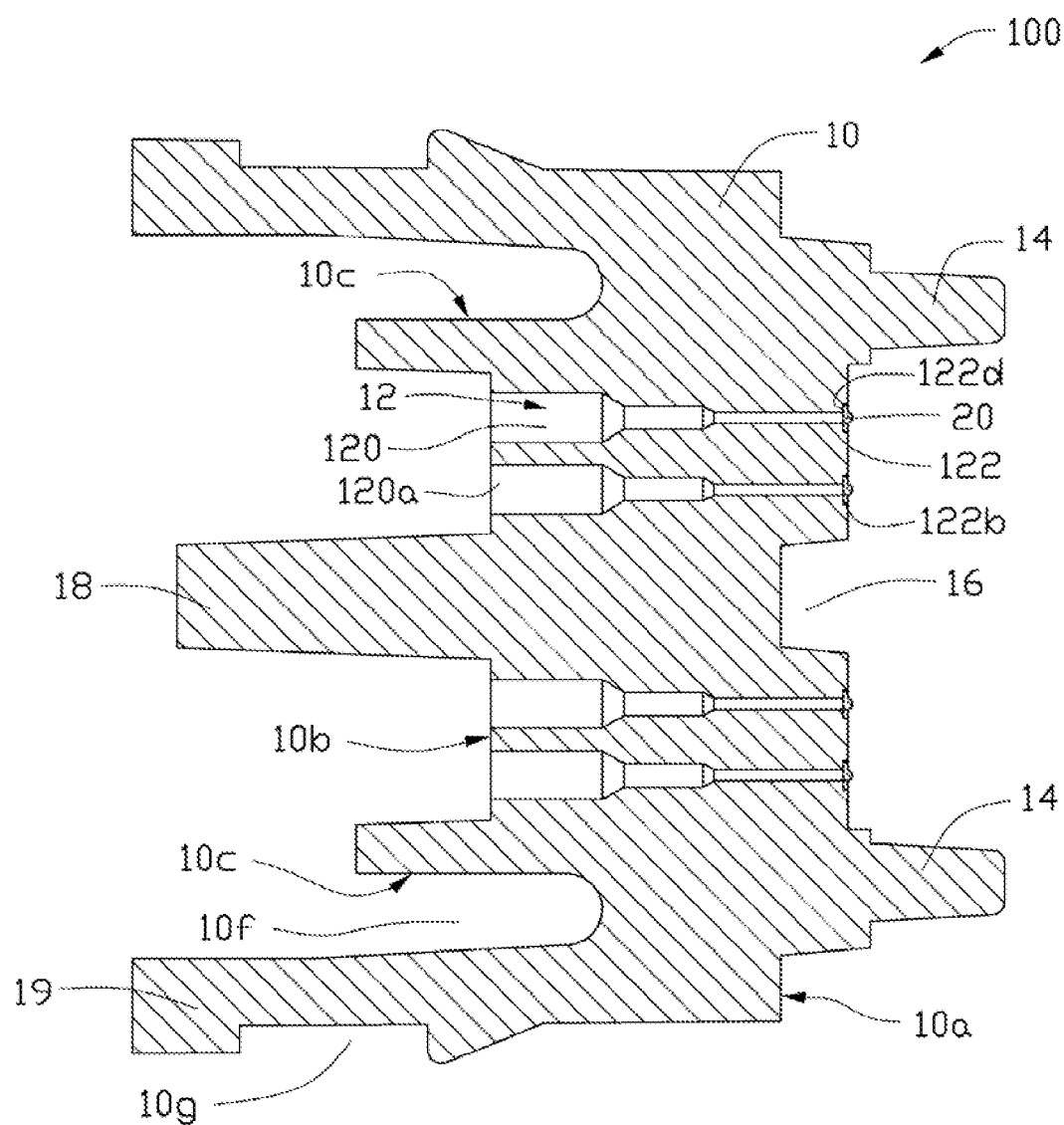
FIG. 3 is a cross-sectional view taken along a line of the optical fiber connector of FIG. 2.

Referring to FIG. 3, the receiving cavities 12 extend from the front wall 10a to the rear wall 10b and through the insulative shell 10. Each of the receiving cavities 12 defines a wide segment 120 and a narrow segment 122 communicated with the wide segment 120. The wide segment 120 defines a first opening 120a on the rear wall 10b for inserting the optical fiber. The narrow segment 122 includes a threaded screw hole 122a at the end away from the wide segment 120. The threaded screw hole 122a communicates with the wide segment 120 through the narrow segment 122, and the narrow segment 122 defines a second opening 122b on the front wall 10a. The converging lens 20 can be received in the threaded screw hole 122a through the second opening 122b. The diameter of the threaded screw hole 122a is larger than that of the narrow segment 122, thus a step 122d is formed between the threaded screw hole 122a and the narrow segment 122. The step 122d can prevent over-screwing of the converging lens 20.

Figure 4:
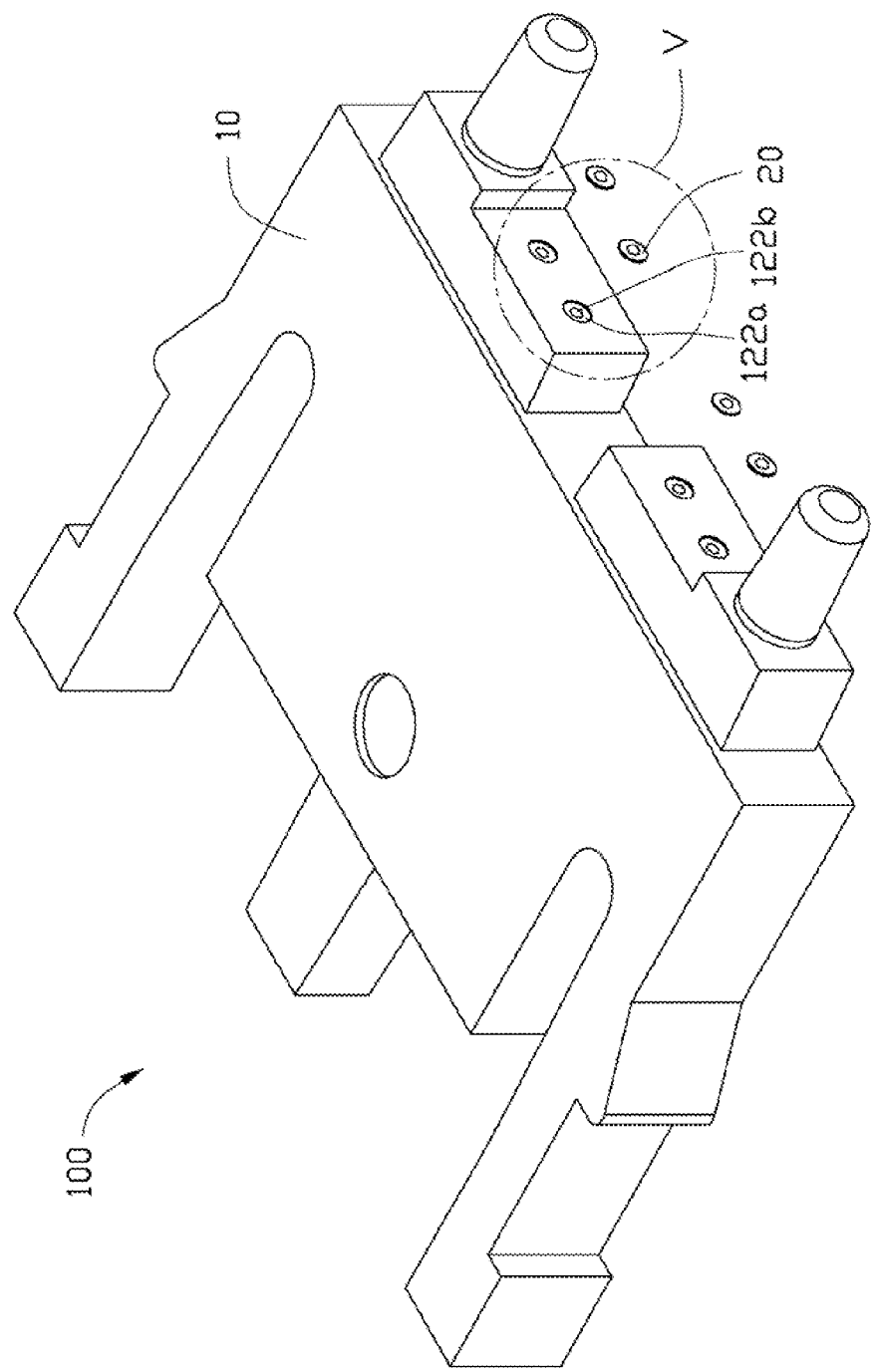
FIG. 4 is an isometric, partially exploded view of the optical fiber connector of FIG. 1.
Figure 5:
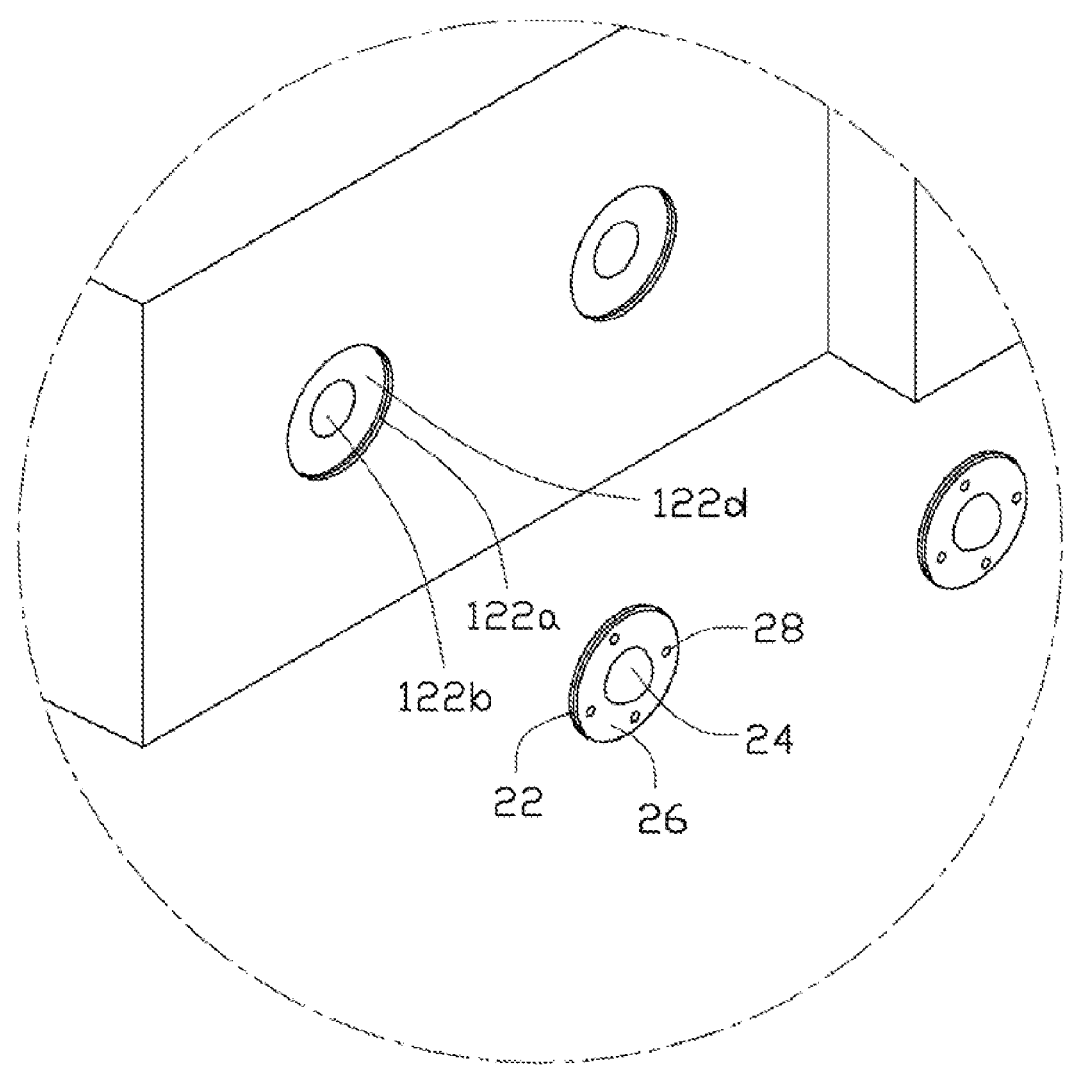
FIG. 5 is an enlarged view of part V of FIG. 4.

Referring to FIGS. 4 to 5, each of the externally threaded converging lenses 20 is a convex lens with a single convex surface exposed out of the second opening 122b. The externally threaded converging lenses 20 can be screwed into the threaded screw holes 122a. In the present embodiment, the externally threaded converging lenses 20 further define an optical area 24 and a non-optical area 26 around the optical area 24 on the convex surface. The diameter of the optical area 24 is equal to that of the narrow segment 122. The outer diameter of the non-optical area 26 is equal to that of the threaded screw hole 122a. The non-optical area 26 defines four concave holes 28, configured for aiding the externally threaded converging lenses 20 to be screwed into the threaded screw holes 122a, when viewed through a microscope (not shown).

In assembly, the receiving cavities 12 snugly receive the corresponding optical fibers, while the narrow segments 122 receive the corresponding cores of the optical fibers. The externally threaded converging lenses 20 are screwed into the threaded screw holes 122a, and the axis of the optical fibers are adjusted to the direction of the optical axis of the corresponding converging lens 20. When the optical fiber connector 100 is in use, the light transmitted in the optical fibers can be emitted to the externally threaded converging lenses 20 and then focused/collimated to the continuous portion 200, to further transmit the light signals to other devices.

Since the externally threaded converging lenses 20 and the insulative shell 10 are separate, whenever one of the externally threaded converging lenses 20 is broken, the insulative shell 10 can be retained while the broken lens 20 is replaced.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
   an insulative shell defining a front wall and a rear wall opposite to the front wall;
   a plurality of receiving cavities extending from the front wall to the rear wall and through the insulative shell, each receiving cavity comprising a threaded screw hole at an end thereof; and
   a plurality of externally threaded converging lenses, wherein each converging lens is screwed in the threaded screw hole at the end of a corresponding receiving cavity and configured to focus and collimate light transmitted from one or more optical fibers received in the receiving cavity, each converging lens has a plurality of concave holes defined in a peripheral portion thereof, and the concave holes are configured for helping screw the externally threaded converging lens into the corresponding threaded screw hole when viewed through a microscope.

2. The optical fiber connector as claimed in claim 1, wherein the insulative shell comprises:
two opposite sidewalls interconnecting the front wall and the rear wall; and
a top wall and a bottom wall interconnecting the front wall, the rear wall, and the sidewalls, respectively;
and wherein two pins extend from the front wall and a cutout is defined between the two pins, the two pins are configured to be engaged with a corresponding continuous portion defining two Universal Serial Bus (USB) interfaces, and a tail portion extends from the rear wall opposite to the cutout.

3. The optical fiber connector as claimed in claim 2, wherein an elastic arm extends from the front wall to the rear wall on each sidewall, and a slot is defined between each sidewall and the corresponding elastic arm.

4. The optical fiber connector as claimed in claim 3, wherein the elastic arms each define a recess in the outer surface thereof away from the corresponding sidewall.

5. The optical fiber connector as claimed in claim 2, wherein each of the receiving cavities defines a narrow segment configured for receiving an optical fiber therein and a wide segment communicated with the narrow segment, the wide segment defines a first opening on the rear wall for inserting the optical fiber, and the threaded screw hole is defined at the end of the narrow segment and communicated with the wide segment through the narrow segment.

6. The optical fiber connector as claimed in claim 5, wherein the diameter of the threaded screw hole is larger than that of the narrow segment, and a step is formed between the threaded screw hole and the narrow segment.

7. An optical fiber connector, comprising:
an insulative shell defining a front wall and a rear wall opposite to the front wall;
a plurality of receiving cavities extending from the front wall to the rear wall and through the insulative shell, each receiving cavity comprising a fiber receiving cavity and a threaded screw hole arranged in that order from the rear wall to the front wall; and
a plurality of externally threaded converging lenses, wherein each converging lens is screwed in a corresponding threaded screw hole and configured to focus and collimate light transmitted from one or more optical fibers received in the corresponding fiber receiving cavity, and a step is formed between the fiber receiving cavity and the threaded screw hole, and each converging lens has a plurality of concave holes defined in a peripheral portion thereof.

8. The optical fiber connector as claimed in claim 7, wherein the insulative shell comprises:
two opposite sidewalls interconnecting the front wall and the rear wall; and
a top wall and a bottom wall interconnecting the front wall, the rear wall, and the sidewalls, respectively;
and wherein two pins extend from the front wall and a cutout is defined between the two pins, the two pins are configured to be engaged with a corresponding continuous portion defining two Universal Serial Bus (USB) interfaces, and a tail portion extends from the rear wall opposite to the cutout.

9. The optical fiber connector as claimed in claim 8, wherein an elastic arm extends from the front wall to the rear wall on each sidewall, and a slot is defined between each sidewall and the corresponding elastic arm.

10. The optical fiber connector as claimed in claim 9, wherein the elastic arms each define a recess in the outer surface thereof away from the corresponding sidewall.

\* \* \* \* \*